(12) United States Patent
Schlüter (10) Patent No.: US 6,285,703 B1
(45) Date of Patent: Sep. 4, 2001

(54) LASER RESONATOR

(75) Inventor: Holger Schlüter, Stuttgart (DE)

(73) Assignee: Trumpf Lasertechnik GmbH (DE)

( * ) Notice: Subject to any disclaimer, the term of this patent is extended or adjusted under 35 U.S.C. 154(b) by 0 days.

(21) Appl. No.: 09/179,070

(22) Filed: Oct. 26, 1998

(30) Foreign Application Priority Data

Oct. 24, 1997 (DE) .............................................. 197 47 060

(51) Int. Cl.$^7$ ...................................................... H01S 3/08
(52) U.S. Cl. ................................................. 372/95; 372/99
(58) Field of Search .................................................. 372/95

(56) References Cited

U.S. PATENT DOCUMENTS

| | | | |
|---|---|---|---|
| 3,969,688 | * 7/1976 | Freiberg | 331/94.5 |
| 4,598,408 | 7/1986 | O'Keefe | |
| 5,353,299 | 10/1994 | Martinen et al. | |
| 5,373,525 | * 12/1994 | Nowack | 372/64 |
| 5,375,130 | * 12/1994 | Shih | 372/2 |
| 5,479,429 | * 12/1995 | Habich | 372/66 |
| 5,640,411 | * 6/1997 | Bochum | 372/64 |

FOREIGN PATENT DOCUMENTS

| | | |
|---|---|---|
| 4123024 | 1/1992 | (DE) . |
| 4129530 | 4/1992 | (DE) . |
| 4421600 | 1/1996 | (DE) . |
| 4424726 | 2/1996 | (DE) . |
| 56-131983 | 10/1981 | (JP) . |
| 07-106669 | 4/1995 | (JP) . |
| 07-254737 | 10/1995 | (JP) . |
| 92/01322 | 1/1992 | (WO) . |
| 05-505701 | 8/1993 | (WO) . |

\* cited by examiner

Primary Examiner—Teresa M. Arroyo
Assistant Examiner—Gioacchino Inzirillo
(74) Attorney, Agent, or Firm—Pepe & Hazard LLP (57) ABSTRACT

A laser resonator is described, with a first and a second end mirror and with coaxial electrodes between which laser radiation reflected back and forth in the direction of an axis of symmetry of the laser resonator passes azimuthally segment by segment through a resonator volume with an annular cross section. The invention is distinguished in that the second end mirror is a substantially conical mirror that deflects the laser radiation striking it to respective azimuthally opposite regions of the resonator volume.

15 Claims, 8 Drawing Sheets

LASER RESONATOR

BACKGROUND OF THE INVENTION

This invention refers to a laser resonator with first and second end mirrors and with coaxial electrodes between which laser radiation is reflected back and forth in the direction of an axis of symmetry of the laser resonator and passes azimuthally segment by segment through a resonator volume having an annular cross section.

Resonators of this type with a coaxial discharge structure are conventionally used for high-performance lasers, i.e. for lasers with up to several kW of laser power, and in particular for gas lasers such as $CO_2$ lasers.

A laser resonator with an annular cross section on which the preamble of claim 1 is based is described in German Patent No. 41 23 024 C2. This laser resonator has coaxial, regular-cylindrical electrodes, with mirrors facing one another provided at their ends, between which the laser radiation travels azimuthally around the axis of symmetry of the resonator in the manner described above.

In this case, one of the end mirrors in particular can be directly connected to the inner electrode or be an integral part thereof, such that merely the outer electrode and the other end mirror have to be adjusted.

Aside from this, other resonators with an annular cross section are known, in which two or more mirrors are adjustable relative to the electrodes and to one another, German Patent No. 41 29 530 C2 or U.S. Pat. No. 5,353,299 are cited here as examples.

The radiation also travels azimuthally in the lasers known in these publications. The differences between the lasers and/or laser resonators known from the aforementioned publications lie primarily in the design of the end mirrors and in the manner in which the laser beam exits.

Another type of coaxial laser, which produces a laser beam with a cross section in the shape of a ring sector, is known from German Patent No. 44 21 600 A1. In this known laser additional mirrors for shaping the laser beam are required in addition to the two end mirrors. The amount of effort necessary to adjust the laser is correspondingly large.

A coaxial laser with a stable resonator, in which the laser radiation is guided over a very complex configuration of mirrors, such that an at least approximately homogenous laser beam emerges centrally, is known from German Patent No. 44 24 729 C1.

A disadvantage of all the resonators described above is that the course of the beam in the resonator volume depends very heavily on the precise adjustment of all components which enclose the resonator volume. Even in the event that only one single mirror requires adjustment, any angular deviation—no matter how slight would result in a clearly out-of-center beam path and, therefore, inferior beam quality. The above adjustment problems, as well as the use of additional folding mirrors, frequently make it more difficult if not impossible to ensure adequate beam quality.

SUMMARY OF THE INVENTION

The object of the invention is to further develop a state-of-the-art laser resonator such that it is substantially robust with regard to adjustments and therefore can be folded with no hazard to or loss of beam quality in spite of the use of additional folding mirrors, if applicable.

SUMMARY OF THE INVENTION

This object is carried out in accordance with the invention in that the second end mirror is a substantially conical mirror that deflects the laser radiation striking it to respective azimuthally opposite regions of the resonator volume.

Between the reflections by the first and the second end mirrors, the laser radiation passes through an annular cross-sectional surface oriented perpendicular to the optical axis, and in time travels azimuthally along this ring around the axis of symmetry lying in the center of the ring. It then strikes a corresponding annular segment of the conical second end mirror according to the invention. This conical mirror first of all reflects each respective impacting laser beam at an approximate right angle towards the optical axis and thereby at an offset of approximately 180° into the azimuthally opposite region of the annular impact surface, where it is deflected back towards the first end mirror by a second reflection. The important thing here is for the doubly reflected beam if applicable, excepting the azimuthal beam inclination required for the travel of the beam to return at the same angle at which it struck the conical mirror beforehand.

In conventional ring resonators, the result of any maladjustment of a mirror is that the laser beam first of all strikes the other mirror at a certain tilt and therefore with a radial offset, and then, after being reflected back, strikes the first mirror with double the radial offset. The same tilting angle in the laser resonator according to the invention results at first in a corresponding radial offset of the points of impact on the conical mirror. Through the double reflection at the conical mirror, with an aperture angle of approximately 45° to the optical axis (the exact aperture angle will be discussed further below), the reflected laser beam strikes the first mirror again at the same angle, i.e., with zero radial offset, namely in the azimuthally opposite region. This inherent compensation of possible adjustment inaccuracies ensure high beam quality, even in resonators with single or multiple folds. The first mirror, as well as the second mirror, which is conical according to the invention, can be circular or conical, or particularly for the purpose of cooling the inner electrode it can be annular in shape. A plurality of corresponding ring segment-shaped mirror sections could likewise be envisaged without limiting the general inventive concept.

In a first embodiment of the invention the first end mirror is radially curved to form a torus and has a beam exit window in a small azimuthal area. The toroidal curvature guarantees that the laser beam keeps to the optimal radius during its progression always offset by 180° according to the invention around the circle.

The exit of the laser beam following the complete round is accomplished in a structurally simple manner by a window which takes up only a small portion of the ring circumference of one of the mirrors.

In a second embodiment the first end mirror has a helical slope by regions, preferably over two azimuthally opposite regions, for the selection of a specific azimuthal beam inclination. The purpose of the helical slope, by which the first end mirror assumes the approximate shape of a spiral strip segment, is not only to produce, but above all to favor a certain azimuthal inclination of the laser radiation. Since in accordance with the invention the radiation is reflected alternately back and forth between two halves of the ring gap, a special feature of the invention is that the laser resonator has two such helical mirror sections azimuthally opposite one another.

In a third embodiment the first end mirror has a helical slope over two semicircular ring segments, to increase the azimuthal beam inclination. A vertex radius associated with the torus curvature of the second end mirror diminishes there as the azimuthal angle grows. In this embodiment, according to which the first mirror has an azimuthal slope over its entire circumference, the azimuthal inclination of the radiation increases continuously during half of the travel cycle, up to its exit from the beam exit window. In order for the radiation to strike the conical mirror within the prescribed radius in spite of this increase, the vertex radius, which determines the torus curvature of this first mirror, diminishes as the azimuthal angle grows and thus counteracts the radially outwardly directed deflection caused by the increasing azimuthal inclination of the radiation.

In a fourth embodiment, for the selection of a specific azimuthal beam inclination, the conical mirror has an aperture angle tuned to a vertex radius associated with the toroidally curved first end mirror. The advantage of this is that instead of an entirely or partly helically climbing first end mirror which is therefore difficult to manufacture, a merely toroidally curved mirror can be used. The beam guidance required in view of the travel around the ring is carried out by adapting the aperture angle of the conical mirror to the vertex radius of the toroidal first mirror. Whereas an aperture angle of exactly 45° would be necessary in the case of a disappearing azimuthal inclination of the radiation, in which the radiation would merely oscillate between two opposing regions of the annular cross section without azimuthally traveling, according to the invention the actual finite azimuthal inclination of the radiation is compensated by an aperture angle which deviates somewhat from this.

In a fifth embodiment, to increase the azimuthal beam inclination, the conical mirror has an azimuthally varying aperture angle over two semicircular ring segments that is adapted to the shape of the first end mirror. In this manner, especially in connection with the third embodiment, the ever increasing azimuthal inclination of the radiation is kept at a constant radius.

In a sixth embodiment a first holding element attached to one end of the resonator and slightly offset azimuthally relative to the beam exit window is provided for the mechanical stabilization of the electrodes and, if applicable, for the selection of a specific direction travel of the laser radiation. Because of the conical mirror, which affects a reflection of the radiation through the circular plane oriented at right angles to the optical axis, namely from all directions, the inner electrode can only be secured at the opposite end, that of the first mirror. However, the beam exit window causes an only somewhat azimuthally offset shadow area to appear at the conical mirror side, and the inner electrode can be held in this shadow area by a stabilizer or the like and can be connected to the outer electrode, without impairment of the beam path. The stabilizer typically consists of ceramic material or any other nonconductive material.

In a further embodiment a second holding element is disposed azimuthally opposite the first one. In conventional resonators, in which the beam completes a full cycle around the annular cross section without continuous mirroring by 180° before it emerges through the exit window, it is not possible to stabilize the inner electrode in this manner, namely from both directions at the conical mirror side. In contrast to this, it is precisely the conical mirror according to the invention that makes this azimuthal two-sided attachment possible. This is because the azimuthal travel positions opposite the exit window and offset from this by 180° are (or would be) passed through in direct succession in the course of the beam passage.

In a further embodiment the electrodes are in direct contact with the resonator volume. This provides for advantageous cooling of the resonator volume from the inside and the outside, since the metallic electrodes are also thermally conductive.

In another embodiment the electrode surfaces are roughened to suppress waveguide modes. By this means the formation of waveguide modes is suppressed in favor of a diffuse radiation scattering at the electrode walls.

In an additional embodiment radially neighboring electrodes are spaced apart by several millimeters to centimeters, to suppress waveguide modes and wave-length effects appearing in the laser resonator during a high-frequency gas discharge. The increased distance between electrodes as compared to conventional circular ring diameters of 1 to 2 millimeters additionally promotes the free propagation of the waves as opposed to a radiation guided through the electrode walls. In a further embodiment of the invention the laser resonator has single or multiple folds and corresponding numbers of folding mirrors. As already mentioned above, only the conical end mirror makes the use of additional optical elements such as folding mirrors possible, since adjusting inaccuracies are corrected by the conical mirror, which compensates any radial offsetting that occurs by reflecting the beam back at the same angle.

In another embodiment additional first and second holding elements are provided within the folded regions of the resonator volume. Since the radiation traverses the regions of all folding cylinders at the same azimuthal angle or at one offset by 180°, only very shortly before emerging through the exit window, and starting from the exit window corresponding shadow areas appear in the resonator volume of the extended beam path in all folding cylinders, a two-sided attachment near the conical mirror of all electrodes inserted one into the other, and thus a stable attachment for all operating positions of the laser is possible.

In an additional embodiment the laser resonator is folded by 2n times and the outermost electrode is grounded. In the case of an even number of folds it is possible and advisable to ground the outer electrode, thereby enhancing the operational safety.

In a further embodiment the resonator is unstable in the azimuthal direction. Whereas in the radial direction an adequate beam coherence is ensured by the limited gap space, in the azimuthal direction there is a risk of multi-oscillations in keeping with a higher Fresnel number if a resonator that is stable in the azimuthal direction is used. The azimuthal instability of the resonator therefore serves for the mode discrimination and thus for the improvement of the beam quality.

BRIEF DESCRIPTION OF THE ATTACHED DRAWINGS

Without restriction of the general inventive concept, the invention is described below on the basis of embodiments given as examples, with reference being made to the accompanying drawings. Moreover, attention is expressly called to the drawings with regard to the disclosure of any details of the invention that are not further explained in the text.

FIG. 1c shows a cross section along line 1—1 of FIG. 1a;

DETAILED DESCRIPTION OF THE ILLUSTRATED EMBODIMENTS

Figure 1:
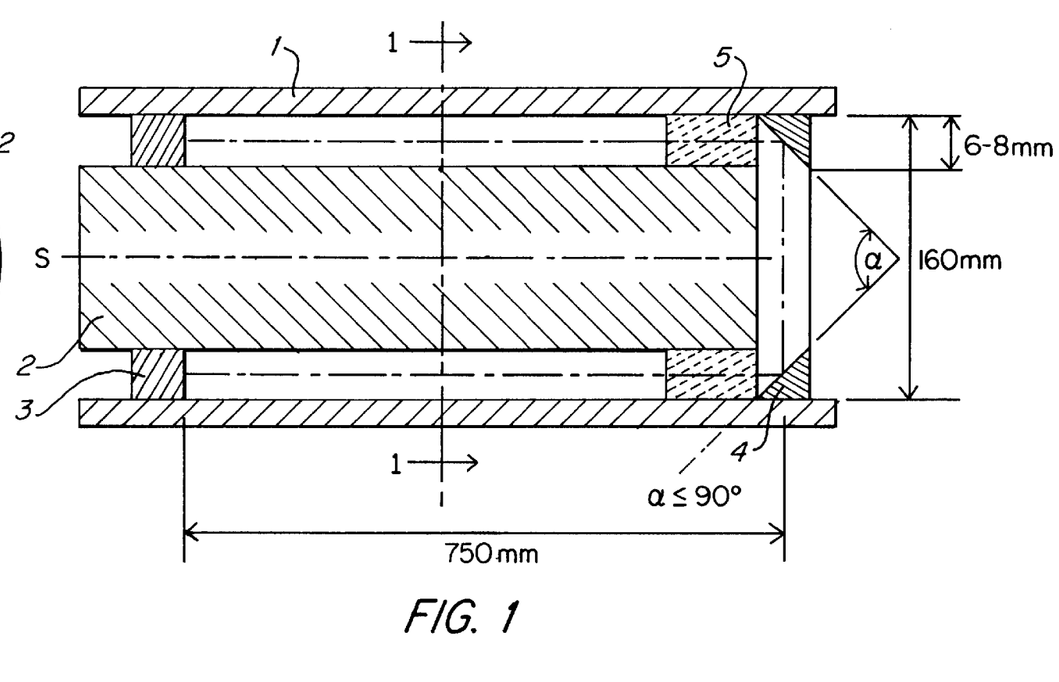
FIG. 1 shows a longitudinal section through a first embodiment of a laser resonator according to the invention.

FIG. 1 shows a first embodiment of a resonator according to the invention, with a regular cylindrical outer electrode 1 and a likewise regular cylindrical inner electrode 2 disposed therein. One of the two electrodes preferably the outer electrode can be grounded. The axis of symmetry of the resonator is shown as S.

The laser resonator has two end mirrors 3 and 4. End mirror 3, which will hereinafter be referred to as the front mirror, is designed in the azimuthal direction in the embodiment shown in FIG. 1 such that the beam travels around the annular space between the two electrodes. Possible designs of the front, mirror by means of which this is accomplished are described below. 31 refers to an exit aperture or window in the end mirror 3. The laser beam exits through this window.

An end mirror 4 provided at the opposite end, which will hereinafter be referred to as the back mirror, is conical in shape, with a cone angle $a \leq 90°$. The mirror 4 deflects the laser radiation to an opposite azimuthal region, From there, the laser radiation is reflected back again to the front mirror 3.

Figure 1A:
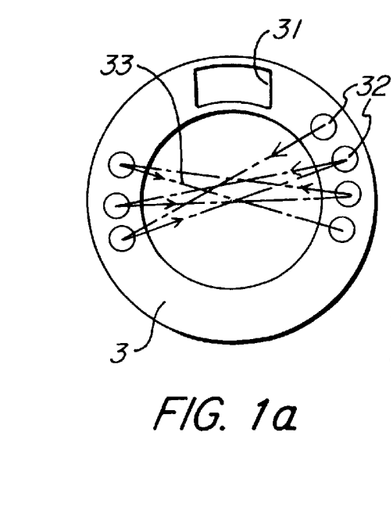
FIG. 1a is a plan view of the front mirror.

The plan view of the front mirror 3 shown in FIG. 1a depicts the different beam impact points 32 of a single bundle of rays and the beam path 33 between the different beam impact points 32 that result from the configuration of the mirror 4 according to the invention.

The dimensions given in FIG. 1 are intended as examples and do not limit the invention.

Figure 1B:
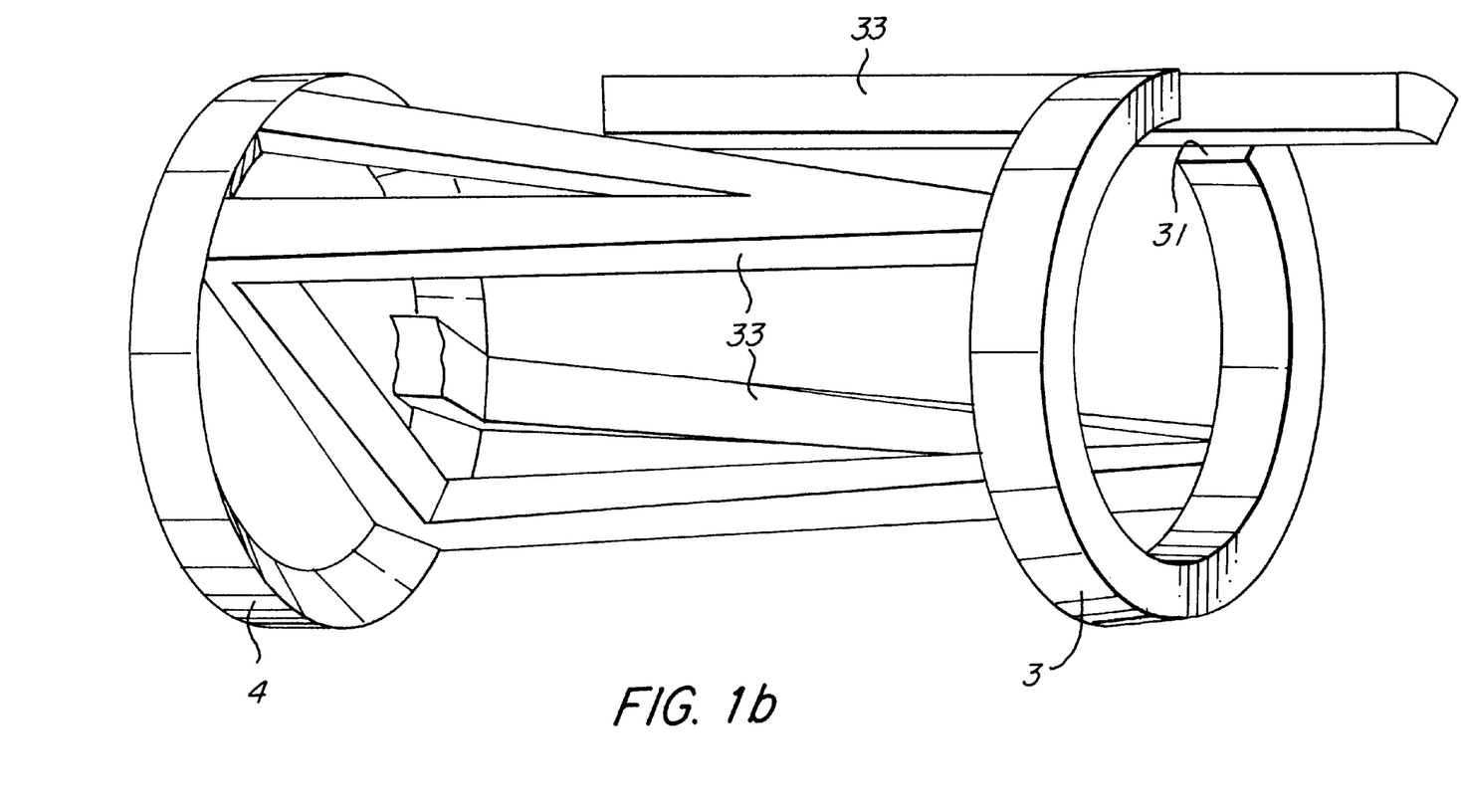
FIG. 1b shows a perspective view of the beam path.

FIG. 1b shows the beam path between the mirrors 3 and 4 in a perspective view. Here it should be noted that the mirror 3 is shown on the right in FIG. 1b, whereas it is on the left in FIG. 1. Other than this, the same parts are provided with the same reference numbers, so it is not necessary to describe them again. However, it should be specifically mentioned that for illustrative reasons the electrodes 1 and 2 are not shown in FIG. 1b.

Two stabilizers 5 are located azimuthally opposite one another between the electrodes 1 and 2. The stabilizers 5, which consist of an insulating material, particularly a ceramic material, hold the inner electrode 2 relative to the outer electrode 1 at the side of the conical back mirror 4. One stabilizer 5 is preferably located in the direct vicinity of the exit window 31. In this configuration the two stabilizers do nott "interfere" with the beam traveling in the resonator. The adjusting robustness of the laser resonator according to the invention is greatly enhanced by the stabilizers provided in a preferred further development of the invention.

Figure 1C:
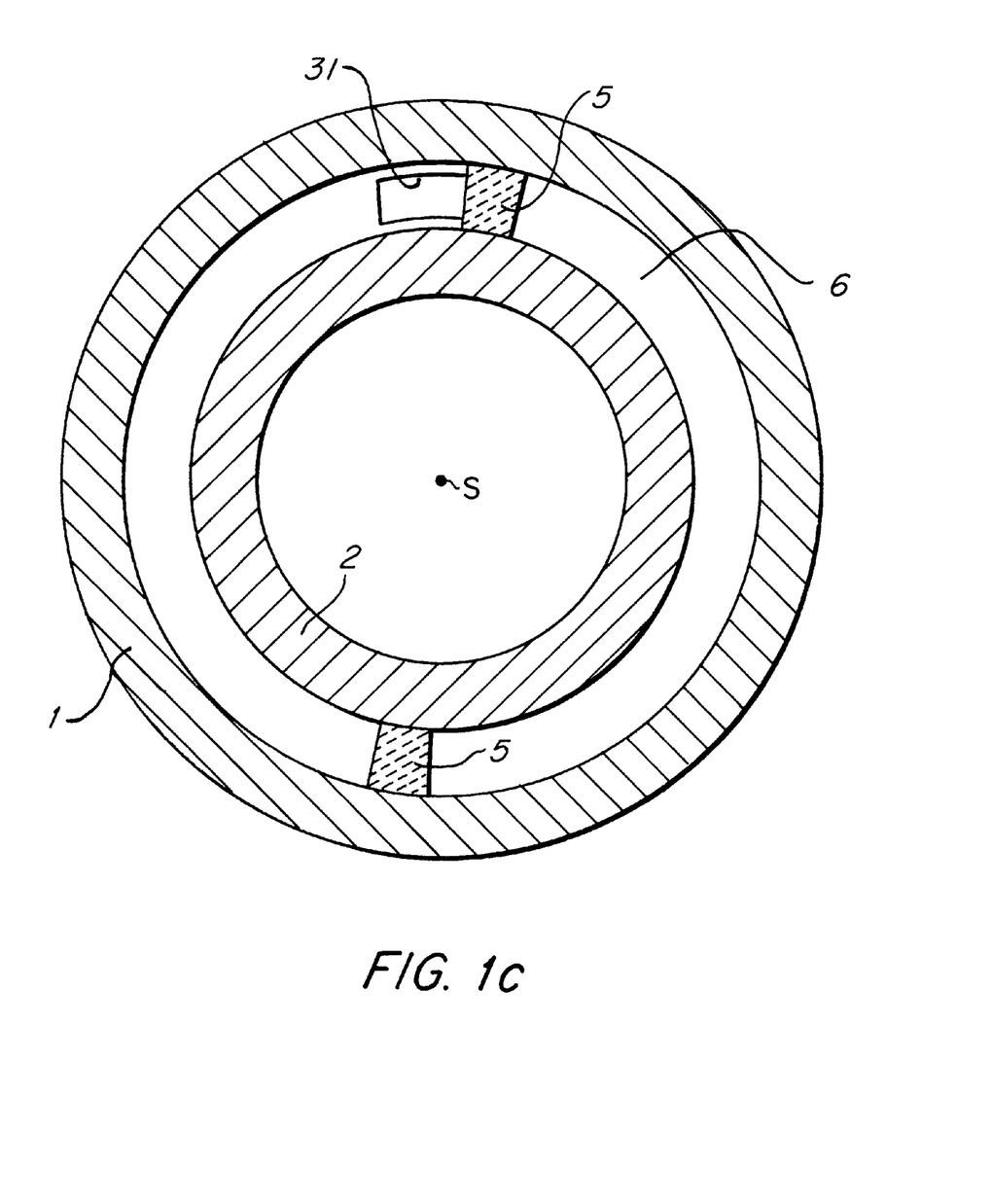

FIG. 1c shows a cross-sectional view of the laser resonator according to the invention, taken along line 1—1 in FIG. 1. As FIG. 1c reveals, the exit window 31 covers a small area in the azimuthal direction, of the resonator volume 6, which has an annular cross section and is enclosed by the electrodes 1 and 2. FIG. 1c further shows that a stabilizer 5 is directly azimuthally adjacent to the exit window 31. The other stabilizer 5 is disposed directly opposite this, at the side of the conical ring mirror 4. Thus, the two stabilizers 5 are arranged in the shadow areas of the exit window 31.

Figure 1D:
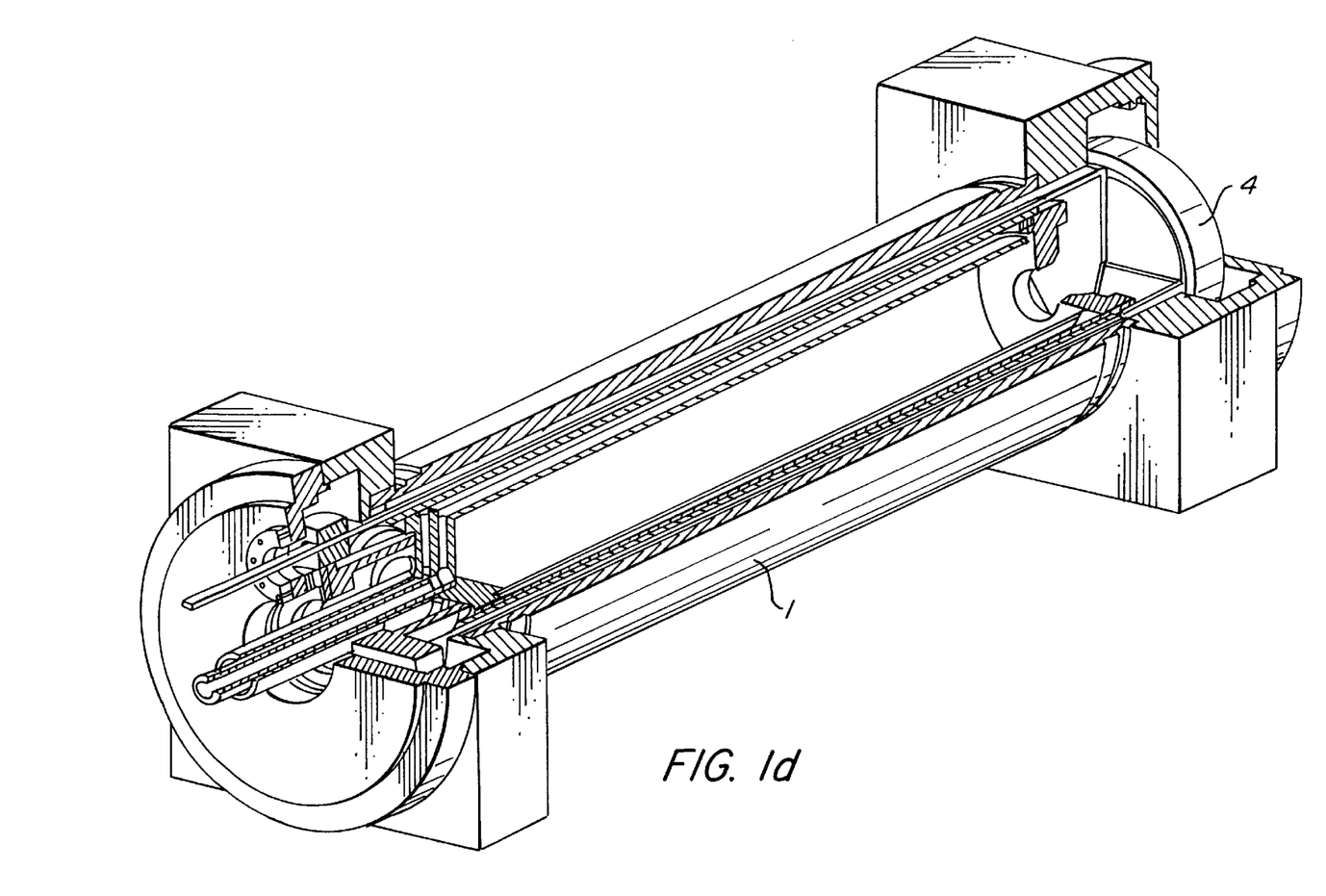
FIG. 1d shows a perspective view of a practical implementation of the first embodiment.

FIG. 1d shows a perspective view of a practical example of a laser resonator according to the invention, with the individual parts bearing the same reference numbers as in FIGS. 1 to 1c. Therefore, a detailed discussion of this drawing is not necessary.

The following three embodiments are cited as examples with reference to the selection of a specific azimuthal beam inclination:

In the first case, the front mirror 3 is provided purely as a torus and has no azimuthal slope. In this case, the vertex radius of the front mirror and the slope of the conical back mirror must be adapted to one another in such a manner that they prefer the same azimuthal beam inclination, Modes with this beam inclination are then eigenmodes of the resonator. Stabilizers are arranged azimuthally directly adjacent to the exit window and/or offset from it by 180° to permit the selection of a specific direction of travel in addition to this double mode discrimination.

In the second case, the front mirror has a helically ascending region for generation of the beam inclination over one, if applicable an additional azimuthally opposite area.

In the third case, the front mirror has a continuous azimuthal slope, particularly over two semi-annular areas. The azimuthally diminishing vertex radius of the front mirror counteracts the growing outward radial offsetting caused by the increasing azimuthal beam inclination.

FIGS. 2a to 2c and 3a to 3c show the mirror contour for the third case in a so-called sag chart. The sag z indicates the distance of a point with the respective coordinate given on the abscissa, from a plane that touches the mirror at a fixed point.

Figure 2A:
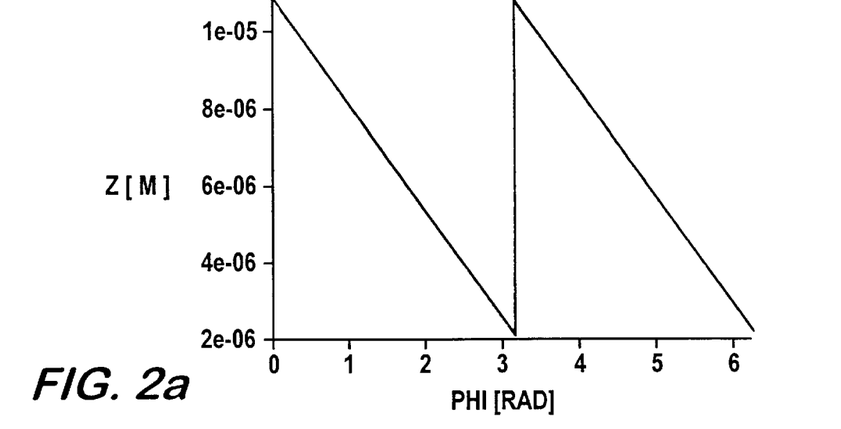
FIGS. 2a–d show charts for explanation of the design of the front mirror.

FIG. 2a shows the sag z (in m) as a function of the azimuth angle phi (in rads). As this Figure reveals, the mirror contour in the azimuth direction comprises two segments, between which a gap appears, with the sag in each segment changing linearly. As FIG. 2a reveals, due to the helical slope the sag decreases continuously two times in the azimuthal direction during one cycle around the front mirror 3, and jumps back to its maximum value on completion of half of a revolution.

Figure 3A:
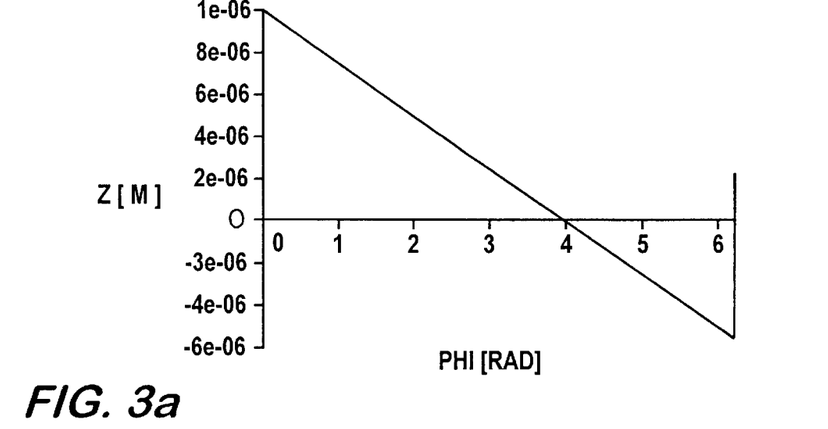
FIGS. 3a–c show charts for explanation of the design of the front mirror in a modified embodiment.

FIG. 3a shows an alternative in which the azimuthal slope changes linearly over the entire travel cycle and subsequently jumps back to the maximum value.

Figure 2B:
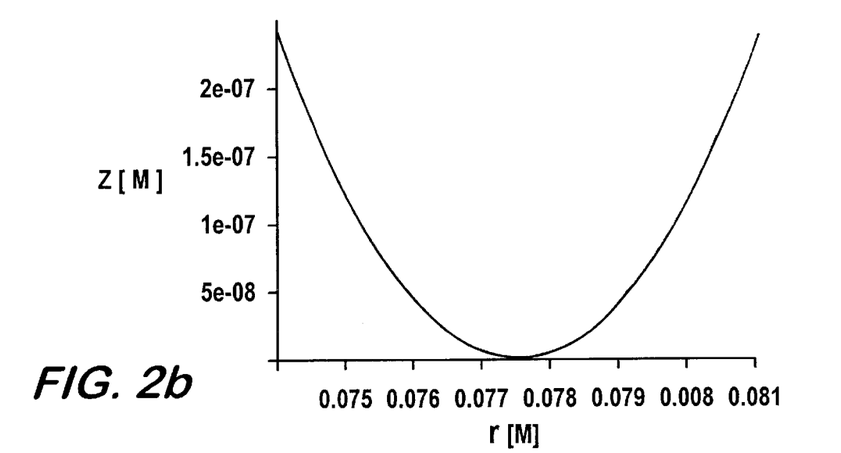
Figure 2C:
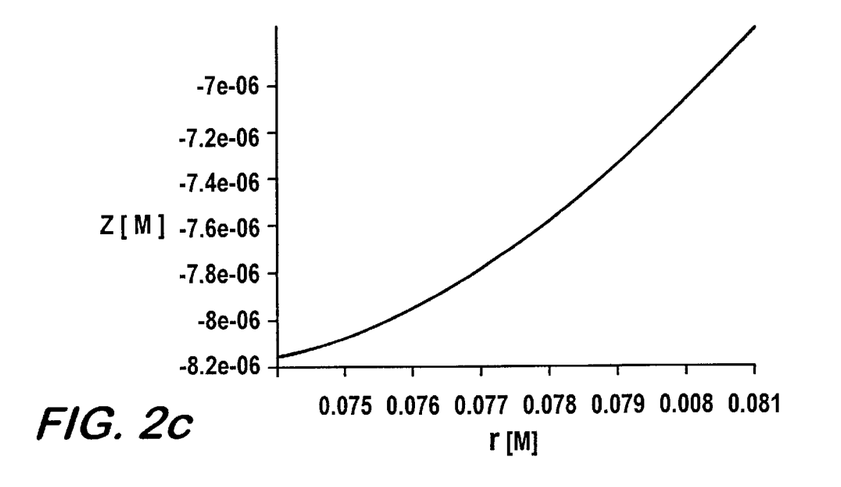
Figure 3B:
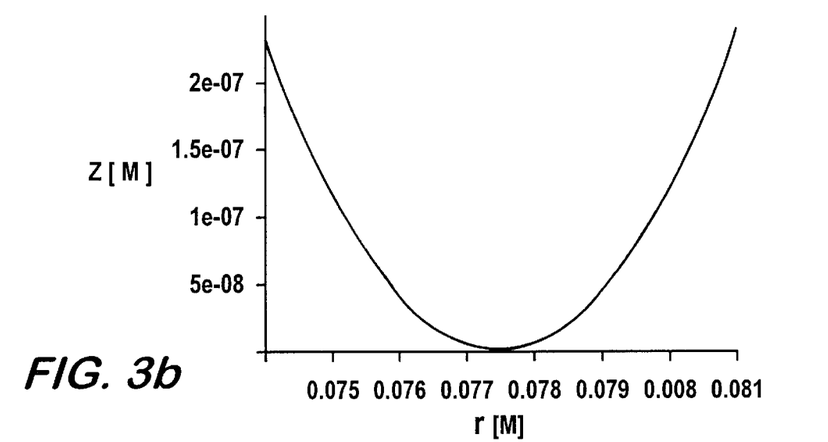
Figure 3C:
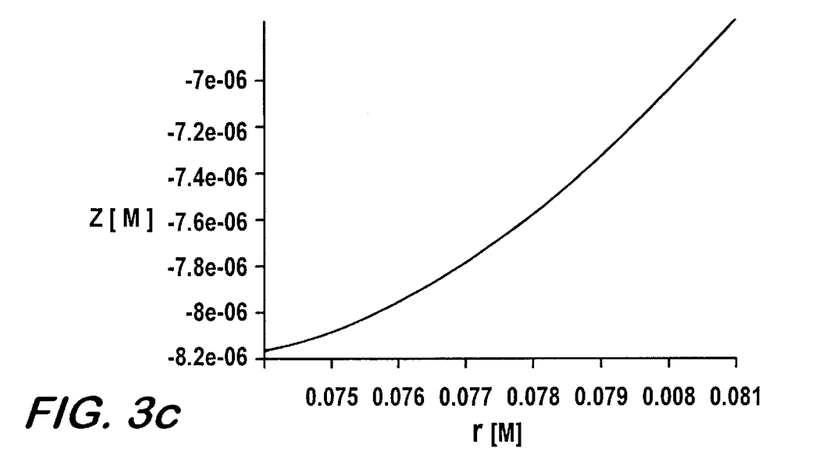

FIGS. 2b and 3b show the sag z (in m) as a function of the radius r (in m) for the azimuth angle $phi(\phi)=0$ and $phi(\phi)=\pi+0.01$, while FIGS. 3c and 3d show the corresponding sag z for the angles $phi(\phi)=$ and $phi(\phi)=2.\pi$ as a function of the radius.

Figure 2D:
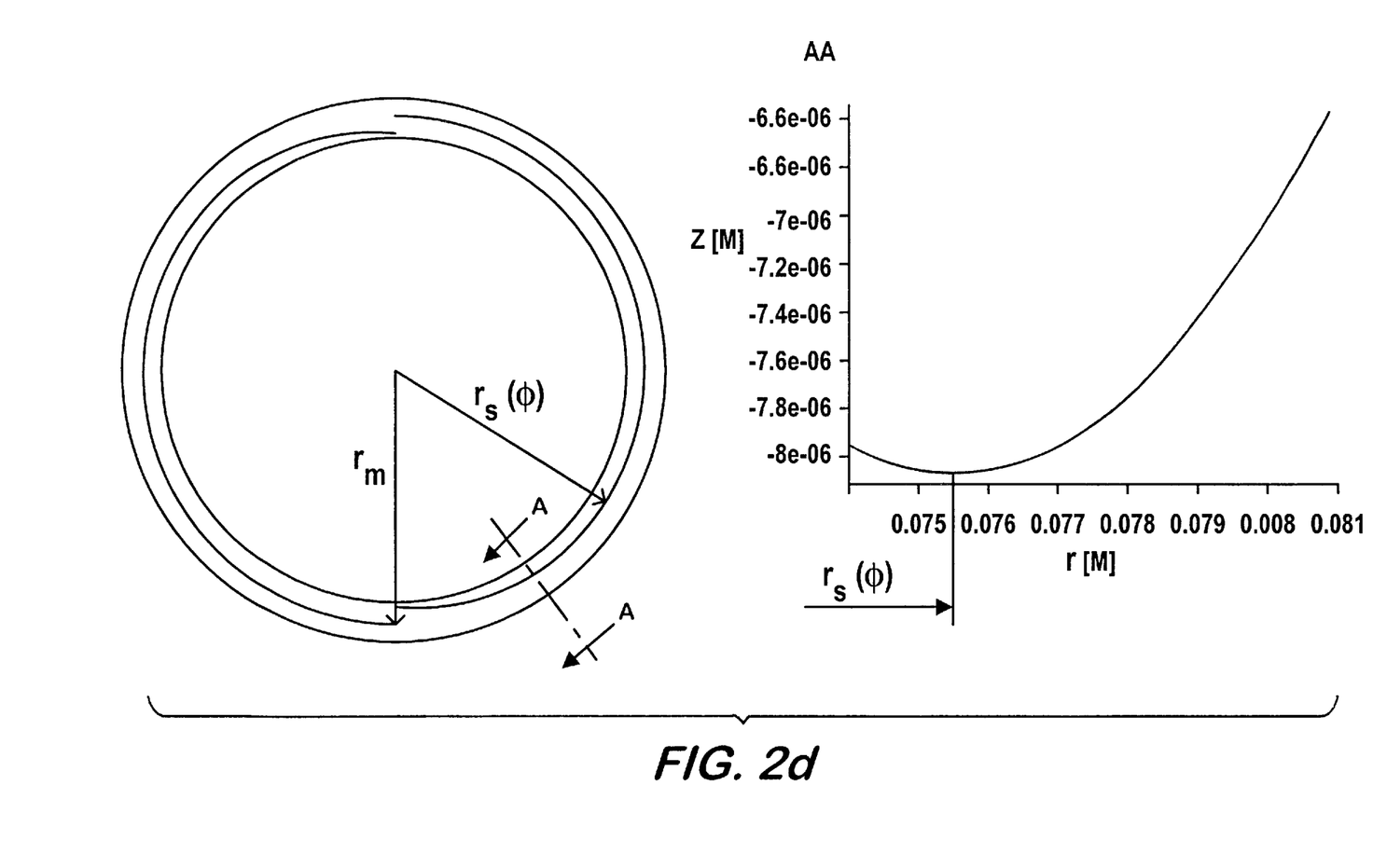

FIG. 2d shows the course of the vertex radius $r_s$ (p). As the azimuthal beam inclination increases, the vertex radius migrates during the travel cycle increasingly towards the axis of symmetry. The radius of the middle of the mirror is designated as $r_m$. The sag z is shown in the right-hand part of FIG. 2d as a function of the radius r in the section along line A—A.

Figure 4:
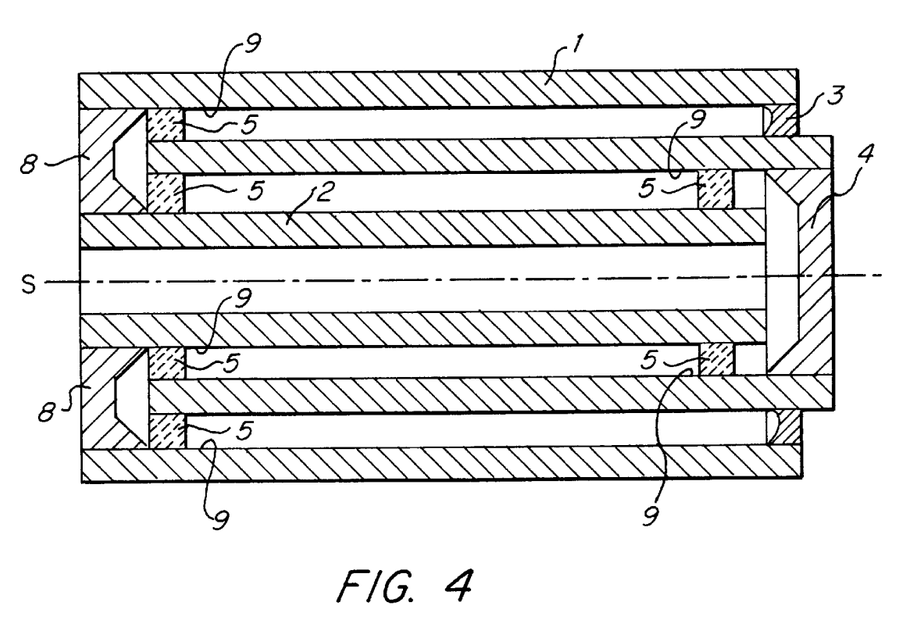
FIG. 4 shows a longitudinal section through a second embodiment having a resonator with a single fold according to the invention.

FIG. 4 shows a further embodiment in which the laser resonator is singly folded. In this case the same parts are provided with the same reference numerals. Two folding mirrors 8 are additionally provided, which reflect the radiation from the front mirror 3 to the conical annular mirror 4 located at the same end. The numerals 9 indicate the shadow areas existing in this embodiment and thus indicate the possible positions of ceramic stabilizers. The positions can also be only partly equipped with stabilizers. The middle electrode 10 is grounded in this case, while the inner and the outer electrodes 11, 12 are supplied with a high-frequency a.c. voltage.

Other folding cylinders analogous to this embodiment are conceivable.

In any case, the laser resonator according to the invention has a number of advantages.

High-power lasers can be realized with the laser resonator according to the invention due to the quality of the diffusion cooling attained by the direct contact of metallic electrodes with the gas-filled space. A ring gap with a constant thickness of less than one centimeter can be maintained, for example, without in any way limiting the inventive concept.

The use of two or more coaxial electrodes results in high electro-optical efficiency with a compact resonator structure.

The electrodes are generally connected along their entire circumference to the front mirror at the front mirror, end, the stabilizers (for instance 5 to 10 mm in width) disposed azimuthally on both sides at the conical mirror end also make multiple folding of the resonator possible, for the passage through a plurality of coaxial discharge structures and, in addition, for the use and operationally reliable mounting of the laser with any spatial orientation.

What I claim is:

1. An unstable laser resonator providing:
   (a) an elongated annular cavity;
   (b) a first mirror at one end thereof;
   (c) a second mirror at the other end thereof, and
   (d) coaxial electrodes about said cavity, said first mirror having a generally toroidal concave reflecting surface and said second mirror having a generally conical reflecting surface for deflecting laser radiation into azimuthally opposite regions of said reflecting surface of said first mirror, one of said mirrors having a beam exit window in an azimuthal area of said reflecting surface thereof, one of said reflecting surfaces of said mirrors including azimuthal deflection effecting means for effecting azimuthal inclination to incrementally displace the laser radiation as it is reflected back and forth between said mirrors until it reaches said exit window.

2. The unstable resonator according to claim 1 including a first holding element at one end of said resonator and slightly offset azimuthally relative to said beam exit window, said holding element providing mechanical stabilization of said electrodes.

3. The unstable laser resonator according to claim 1 wherein said electrodes have a surface in direct contact with and bounding said resonator cavity.

4. The unstable laser resonator according to claim 1 wherein radially adjacent electrodes are spaced apart for suppression of waveguide modes and of wave-length effects appearing in said laser resonator during a high-frequency gas discharge.

5. The unstable laser resonator according to claim 1 including folding mirrors providing at least one fold.

6. The unstable laser resonator according to claim 1 wherein the azimuthal deflection effecting means is provided by a helical slope in the azimuthal direction of the generally toroidal concave reflecting surface of said first mirror.

7. The unstable laser resonator according to claim 1 wherein the azimuthal deflection effecting means is provided by an aperture angle for said generally conical surface of said second mirror which is slightly smaller than 90°.

8. The unstable resonator according to claim 2 including a second holding element disposed azimuthally opposite said first holding element.

9. The unstable laser resonator according to claim 3 wherein said surfaces of said electrodes are roughened to suppress waveguide modes.

10. The unstable laser resonator according to claim 5 including additional first and second holding elements within the folded regions of said resonator cavity.

11. The unstable laser resonator according to claim 5 wherein the outermost electrode is grounded.

12. The unstable laser resonator according to claim 6 wherein said generally toroidal concave reflecting surface of said first mirror is comprised of a pair of semicircular segments with symmetrical helical slopes.

13. The laser resonator according to claim 10, characterized in that said laser resonator is folded 2n times and the outermost electrode (12) is grounded.

14. The unstable laser resonator according to claim 12 wherein said generally toroidal concave reflecting surface has a decreasing vertex radius corresponding to the increasing inclination of the laser radiation along said semicircular segments.

15. The unstable laser resonator according to claim 12 wherein the azimuthal deflection effecting means is provided by an aperture angle for said generally conical reflecting surface of said second mirror cooperating with said generally toroidal reflecting surface of said first mirror, said aperture angle varying azimuthally over two semicircular segments in cooperation with the semicircular segments of said generally toroidal concave reflecting surface of said first mirror, said aperture angle decreasing azimuthal corresponding to the increasing inclination of the laser radiation along the helical slope of the reflecting surface of said first mirror.

* * * * *